United States Patent Office 3,460,918
Patented Aug. 12, 1969

3,460,918
METHOD OF CHLORINATING METALS WITH CARBON TETRACHLORIDE AND CARBON DIOXIDE
Harley A. Wilhelm and Roger M. Bergman, Ames, Iowa, assignors to the United States of America as represented by the United States Atomic Energy Commission
No Drawing. Filed Jan. 12, 1968, Ser. No. 697,314
Int. Cl. C01f *15/00;* C22b *59/00*
U.S. Cl. 23—345               7 Claims

ABSTRACT OF THE DISCLOSURE

A method of making high-purity metal chlorides by passing a gaseous mixture of carbon dioxide and carbon tetrachloride over a metal compound while heating the compound to an initial chlorination temperature of 400–475° C. for a period of time. When chlorination is complete at this temperature, the temperature is raised to one or more final chlorination temperatures above 500° C. until the metal compound is chlorinated as a high-purity metal chloride.

Contractual origin of the invention

The invention described herein was made in the course of, or under, a contract with the United States Atomic Energy Commission.

Cross references

This application is a continuation-in-part of application Ser. No. 660,884, filed Aug. 10, 1967, now abandoned.

Background of the invention

This invention relates to a method of making very pure metal chlorides. More specifically, this invention relates to a method of chlorinating metal compounds to form metal chlorides which contain very little or no carbon. The metal chlorides can then be reduced to form high-purity metals.

The demand for metals of high purity is steadily increasing as new technologies appear which require such metals for their unusual properties. For example, thorium is a fertile material that can be converted into fissionable uranium-233 in a nuclear reactor by bombardment with thermal neutrons. Use of thorium in an atomic reactor requires metal of a very high degree of purity to prevent loss of neutrons, resulting in lowered conversion of the thorium to uranium-233.

Pure metals can be obtained by chemical reduction of the metal halides, chemical reduction of the metal oxides, electrolytic reduction of metal compounds, thermal decomposition of the metal iodides, and solvent extraction. Of these, the most common method used for obtaining large amounts of pure metals is the chemical reduction of metal halides. In this method, as in most other methods, the maximum possible purity of the metal product is limited by the combined purity of the metal chloride and the reducing agent, since many common impurities are concentrated in the metal product. Atlhough the metal reducing agents are readily obtainable in a high degree of purity, the metal chloride definitely presents a considerable problem in this respect, particularly in regard to carbon contamination.

There are several methods presently in use to make metal chlorides, most of which do not provide chlorides sufficiently free of impurities to result in high-purity metals.

The most common chlorination method is to mix carbon and a metal oxide together, heat it to about 500–800° C. and pass chlorine through the heated mixture. This method is economically desirable because the starting products are relatively inexpensive; however, the chloride is usually contaminated with carbon since it is extremely difficult to obtain stoichiometric starting mixtures.

Further steps are then necessary to purify the chloride. Some metal chlorides may be purified by sublimation; however, often some carbon and oxide which may be present will also carry over. Soluble chlorides may be purified by dissolution in water followed by filtration to physically remove any carbon present. This method will not work with the rare earth chlorides because they hydrolyze and thus cannot be recovered.

Another chlorination method is to mix the metal oxide with sulfur chloride and heat the resulting mixture. Although the sulfur chloride is a good chlorinating agent, it is relatively expensive, at higher temperatures it is very corrosive and the resultant product is subject to contamination by the sulfur, necessitating a further purification step which is an additional expense as well as time-consuming.

Phosgene is still another chlorinating agent; however, it is extremely poisonous and difficult to use.

A mixture of carbon tetrachloride and an inert carrier gas such as argon has also been studied as a chlorinating agent. However, this agent apparently does not work too well as the product is subject to carbon contamination and thus has not found too much favor.

Summary of the invention

We have invented a process which eliminates the additional purification steps required and many of the other difficulties associated with the other processes and yet produces metal chlorides of surprisingly high purity. The process of this invention comprises passing, as a gaseous mixture, carbon dioxide and carbon tetrachloride over a metal compound while heating the compound to several increasingly higher temperatures and holding the compound at each of these temperatures for a period of time. By this process, the metal compound is converted to a high-purity metal chloride which can then be reduced without the necessity of any purification steps to a high-purity metal.

It is therefore one object of this invention to provide a process for making high-purity metal.

It is another object of this invention to provide a process for making high-purity metal which has fewer steps and is less hazardous than existing processes.

Description of the preferred embodiment

These and other objects of the invention can be obtained by passing a gaseous mixture of carbon dioxide and carbon tetrachloride over a metal compound while slowly heating the compound to a temperature of from 400–475° C. and maintaining this temperature for 2 to 6 hours or until such time as substantially all of the chlorination which will take place at this temperature is completed. Then, while maintaining the flow of gas, the temperature of the now partially chlorinated compound is raised to from 500 to 650° C. for 1 to 5 hours or until all chlorination is completed. At this time all of the metal compound has been converted to a metal chloride which contains very few impurities. This metal chloride is then reduced by conventional methods to metal which contains only minor amounts of oxygen, nitrogen and carbon as impurities.

It is expected that the process of this invention could be used in the chlorination of any metal, including those of the actinide and lanthanide series, although it would not be used for some metals where other processes are obviously better suited. It is possible to use this method to chlorinate many compounds of these metals, for example carbonates, oxides, oxalates, hydroxides, nitrates and sulfates. Of these, the carbonates and oxalates are the easiest to chlorinate, while the nitrates and sulfates produce corrosive byproducts. For example, it was found that thorium oxalate was the best starting material for chlorinating thorium, since the best yields were obtained with its use. Thorium nitrate, thorium sulfate and high-fired thorium oxide all gave products that were somewhat water-insoluble when chlorinated with a gaseous carbon dioxide and carbon tetrachloride mixture at 525° C. for 4 hours. Low-fired thorium oxide chlorinated substantially better, but only the product from thorium oxalate came close to being 100% water-soluble. The source of thorium oxalate did not affect the results in any way, since both locally prepared and commercially purchased thorium oxalate were used with no difference in results. Before using, the compound was passed through a 100 mesh screen to break up any lumps.

The temperatures to which the metal compound is heated during chlorination are critical as is the minimum length of time at which the compound is maintained at each temperature.

The chlorination temperatures are dependent upon the compound being chlorinated and are divided into two kinds. Initial chlorination temperature is defined as the first temperature above 200° C. at which the charge is held. The finishing temperatures or final chlorination temperatures are those temperatures higher than the initial chlorination temperature at which the reaction is held for an extended period.

Initial chlorination temperatures, it was found, could range from 400 to 475° C.; however, temperatures between 425 and 475° C. appeared to give slightly better results. The length of time that the compound was held at the initial chlorination temperature was found to vary with the temperature which was used. It was found that at an initial chlorination temperature of 425° C. the time should be greater than 2 hours to complete all chlorination which will take place at this temperature, but that chlorination in excess of 4 hours at this tempearture gave no noticeable improvement, although times as long as 6 hours were used. Temperatures which are too high during the initial chlorination period may result in greatly decreased yields. It is thought that these high temperatures lead to formation of unreactive products which are difficult to chlorinate. For example, unreactive oxides may form and oxalates may decompose too rapidly for effective chlorination to occur during decomposition.

The final chlorination temperatures must be greater than 500° C. The final chlorination can be done in one step by heating the partially chlorinated compound for at least 2 hours. However, it was found that if final chlorination was accomplished in two steps within this temperature range, improved results were obtained. The partially chlorinated compound is first heated to 500 to 550° C. for about an hour or until chlorination at this temperature is completed. The compound is then heated to about 600° C. for an hour or until all of the compound has been chlorinated. Temperatures higher than 650° C. may cause carbon contamination by decomposing the carbon tetrachloride too rapidly and should generally be avoided. However, temperatures as high as 700–800° C. may be necessary depending upon the metal compound being chlorinated. Heating times longer than the times given may result in improved product purity. Shorter times may result in incomplete chlorination and product contamination.

The following table gives representative times at various temperatures at which chlorination of thorium oxalate was carried out. A 3 to 2 mixture of carbon dioxide and carbon tetrachloride was used. The carbon tetrachloride flow rate was about 60 grams per hour. The heating rate was such that it took about 25–30 minutes to heat from 200° C. to 425° C. and took about 15–20 minutes each to heat from 425° C. to 525° C. and from 525° C. to 610° C.

TABLE I

| Ex. No. | Temp., °C. | Time at temp., hrs. | Cl/Th ratio in product | (Cl/Th ratio) (100/4)=yield, percent |
|---|---|---|---|---|
| 6-A | 200<br>425 | 2<br>6 | 3.77 | 94.2 |
| 6-B | 200<br>430 | 2<br>11½ | 3.62 | 90.5 |
| 6-C | 200<br>430<br>525 | 2<br>4<br>1½ | 3.73 | 93.2 |
| 6-D | 200<br>425<br>510<br>610 | 2<br>2<br>1<br>1½ | 3.87 | 96.7 |
| 6-E | 200<br>425<br>510<br>610 | 2<br>2½<br>1<br>1½ | 3.91 | 97.7 |
| 6-F | 200<br>525<br>610 | 2<br>5<br>1 | (¹) | |
| 6-G | 200<br>525<br>610 | 2<br>5<br>2 | 3.61 | 90.2 |
| 6-H | 200<br>475<br>610 | 3<br>5<br>1 | 3.92 | 98.0 |
| 6-I | 200<br>425<br>525<br>610 | 2<br>4<br>1<br>1 | 3.97 | 99.4 |
| 6-J | 200<br>425<br>510<br>610 | 2<br>4½<br>1<br>1 | ¹ 3.95; 3.97 | ² 98.9; 99.2 |
| 6-K | 200<br>425<br>510<br>610 | 2<br>12<br>4<br>3 | 3.97 | 99.4 |
| 6-L | 200<br>425<br>510<br>610 | 2<br>4<br>1<br>1 | 3.96 | 99.12 |
| 6-M | 200<br>375<br>510<br>610 | 2<br>6<br>1<br>1 | 3.73 | 93.2 |
| 6-N | 200<br>400<br>510<br>610 | 2<br>5<br>1<br>1 | 3.84 | 96.0 |

¹ No analysis made; not 100% H²O soluble.
² Duplicate run.

It is evident from Table I, and in particular runs 6–A and 6–B, that 425 C. is not a sufficiently high temperature to complete the chlorination. Even when the chlorination is finished at 525° C. (run 6–C) the yield is poor. However, when the chlorination is finished at 610° C. after first chlorinating at 425° C. and 510° C., the chlorination yield is improved and yields of about 97% are obtained (runs 6–D and 6–E). Runs 6–F and 6–G show that the initial temperature for chlorination should be lower than 525° C. When the initial temperature for chlorination was lowered to 475° C. (run 6–H) from 525° C., the yield increased markedly from 90% to 98%. If the initial chlorination temperature is further lowered to 375–400° C. (runs 6–M and 6–N), however, the yield is substantially decreased with 400° C. being better than 375° C.

The optimum initial chlorination temperature, therefore, would appear to be approximately between 425 and 475° C.; the optimum finishing temperature should be greater than 525° C. and probably in the neighborhood of 600° C. Chlorination conditions consistent with these optimized temperatures were used in runs 6–I—6–L where yields from 98.9–99.4% of theoretical chlorination were achieved. The average yield of these five runs was 99.2%. Comparison of these results with those achieved in run 6–D indicates that the time at an initial chlorination temperature of 425° C. should be greater than 2 hours, but chlorination in excess of 4 hours at this initial temperature has no noticeable effect.

As can be seen in Table I, the thorium oxalate was initially heated to 200° C. and held for 2 hours. This was done to remove any nitric acid which might be present in the thorium oxalate and also to remove any water of hydration which is present in the crystals. It was found that by heating the oxalate slowly the same purpose was accomplished and this initial heating step could be eliminated with no loss in product yield or purity.

The flow rates of the carbon dioxide-carbon tetrachloride gas mixture were found not to affect the yield or product purity. Carbon dioxide flow rates of 50 to 200 cc./min. were attempted using a carbon dioxide:carbon tetrachloride molar ratio of 5:3. Chlorination within these flow rate limits ranged from 99.0 to 99.6% of complete chlorination. No relationship between carbon dioxide flow rate and the chlorination yield was found.

Carbon dioxide:carbon tetrachloride molar ratios of from 0.8:1 to 4:1 were found to provide satisfactory thorium oxalate chlorination. The optimum ratio was found to be from about 0.8:1 to 1.6:1. Too great an amount of carbon tetrachloride was found to cause some carbon contamination in the final product. A lack of carbon tetrachloride resulted in poor chlorination due to lack of sufficient chlorine present to react with the decomposing compound.

Reduction of the metal chlorides to metal may be accomplished by any method known to those skilled in the art.

The following example is given as an illustration of the process of this invention and is not to be taken as limiting the scope or extent of the invention.

EXAMPLE

Two silica boats, each 8 x 3 x 1½ inches, were filled with thorium oxalate to a depth of 1½ inches and placed in a silica chlorination tube 5 inches in diameter. A gaseous mixture of carbon dioxide and carbon tetrachloride in an approximately 5:3 mole ratio and a flow rate of 65 grams carbon tetrachloride per hour was passed through the chlorination tube. The oxalate was treated at 200° C. for 2 hours, 425° C. for 6 hours, 510° C. for 1½ hours, and 610° C. for 2 hours. Products with chloride to thorium mole ratios of 3.96 to 3.98 were produced.

This tetrachloride was reduced in two batches by the magnesium reduction process. The magnesium used in the reduction had been doubly distilled and had a carbon content of about 100–150 p.p.m. The thorium tetrachloride and about 2.2 times the stoichiometric amount of magnesium were loaded into a tantalum crucible and placed in a retort. These operations were conducted in a dry argon atmosphere. The retort and charge were evacuated and then heated to about 450–500° C. and held for about ½ hour to complete outgassing. The retort was then filled with argon and heated to 950° C. and held for 1 hour while maintaining the argon pressure slightly above atmospheric. After the product was allowed to cool under the inert atmosphere, the thorium-magnesium alloy was removed from the crucible, separated from the slag, and placed in a titanium crucible which was heated at 950° C. from 12 to 24 hours under a dynamic vacuum of about $10^{-5}$ mm. of Hg to remove the magnesium and any adhering slag. The thorium sponge residue was consolidated by arc melting. Upon analysis it was found to have an oxygen content of about 925 p.p.m., carbon content of about 27 p.p.m. and 3 p.p.m. nitrogen. Vickers hardness number was about 38 to 44, which after annealing for 48 hours at 900° C. was reduced to 33 to 36.

In Table II is set forth a number of metal compounds which have been chlorinated by this method to illustrate the general application of this invention. The table also compares the results obtained with using carbon dioxide as a carrier gas to the use of argon. A 3 to 2 mixture of carbon dioxide to carbon tetrachloride was used. The carbon tetrachloride flow rate was about 60 grams per hour. The gas flow was started when the temperature of the fixed bed reactor reached 200° C. and the heating rate was such that it took about 25–30 minutes to heat from 200° C. to 430° C. and took about 15–20 minutes each to heat from 430 to 510° C. and from 510 to 610° C. All conditions remained the same when argon was used except for the difference in carrier gas. This table is not to be taken as limiting the method of this process, but merely as illustrating the broad aspects of this invention.

TABLE II

| Starting material | Temp., ° C. | Time at temp., hrs. | Yield, percent $CO_2+CCl_4$ | $A_2+CCl_4$ |
|---|---|---|---|---|
| Cerium oxalate | 430<br>510<br>610 | 4<br>1<br>1 | 98.0 | 78.7 |
| Yttrium oxalate | 430<br>510<br>610 | 4<br>1<br>1 | 93.1 | 87.4 |
| Erbium oxalate | 430<br>510<br>610 | 4<br>1<br>1 | *74.2 | *74.3 |
| Praseodymium oxalate | 430<br>510<br>610 | 4<br>1<br>1 | *100 | *100 |
| Samarium oxalate | 430<br>510<br>610 | 4<br>1<br>1 | 100 | 95 |
| Neodymium oxalate | 430<br>510<br>610 | 4<br>1<br>1 | *100 | *100 |
| Yttrium oxalate | 450<br>560 | 4<br>4 | 95–96 | 89–40 |
| Cadmium carbonate | 450<br>550<br>525 | 4<br>5<br>1½ | 96.3 | 60–70 |
| Magnesium carbonate | 450<br>550<br>625 | 4<br>5<br>1½ | 99.0 | 97.5 |
| Lead oxide | 450<br>550<br>625 | 4<br>5<br>1½ | (**) | ———— |
| Cerium oxide (high-fired) | 450<br>550<br>625 | 4<br>5<br>1½ | ~40 | (¹) |
| Yttrium oxide (low-fired) | 450<br>560<br>625 | 3¼<br>1⅖<br>2 | ~64–70 | ~60 |
| $Pr_6O_{11}$ (low-fired) | 450<br>560<br>625 | 3¼<br>1⅖<br>2 | 94 | (¹) |
| Neodymium oxide (low-fired) | 450<br>560<br>625 | 3¼<br>1⅖<br>2 | 82 | (¹) |
| Erbium oxide (low-fired) | 435 | 3 | 55 | *50 |

¹ Not run.
*Product contaminated with 0.2–0.3% carbon.
**Not analyzed—white product characteristic of lead chloride was obtained with $CO_2$ and was not obtained using $A_2$.

It can be seen in Table II that most metal compounds chlorinated quite well using the method of this invention and that the results obtained with carbon dioxide were as good as, if not an improvement over, the results obtained using argon. Except for the products marked by a single asterisk, the products were carbon-free.

It will be understood that the invention is not to be limited by the details given herein but that it may be modified within the scope of the appended claims.

The embodiments of the invention in which an exclusive property or privilege is claimed are defined as follows:

1. In the method of chlorinating metal carbonate, oxide or oxalate compounds with carbon tetrachloride in a carrier gas, the improvement comprising continuously:
   passing and maintaining a gaseous mixture of carbon dioxide and carbon tetrachloride having a mole ratio of from 0.8:1 to 4:1 over said compound while:
   (a) slowly heating said metal compound to a temperature sufficient to initiate chlorination,
   (b) maintaining the initial chlorination temperature until substantially all the chlorination which will take place at this temperature is completed and said metal is partially chlorinated,
   (c) heating said partially chlorinated metal compound to chlorination completion temperature, and
   (d) maintaining said temperature until all of said partially chlorinated metal compound is converted to high-purity metal chloride.

2. The improvement of claim 1 wherein the metal is selected from the group consisting of cerium, yttrium, erbium, praseodymium, samarium, neodymium, cadmium, magnesium, lead and thorium.

3. The improvement of claim 1 wherein the initial chlorination heating is at a temperature from 400 to 475° C. and the final chlorination heating is at a temperature greater than 500° C.

4. The improvement of claim 1 wherein the initial chlorination heating is at a temperature from 425 to 475° C. and the final chlorination heating is at a temperature from 500 to 650° C.

5. The improvement of claim 2 wherein the final chlorination heating is at a temperature from 500 to 550° C. for at least one hour and also at a temperature of 600 to 650° C. for at least one hour.

6. The improvement of claim 4 wherein the mole ratio of carbon dioxide to carbon tetrachloride is from 0.8:1 to 1.6:1.

7. The method of making high-purity thorium metal comprising continuously:
   passing and maintaining a gaseous mixture having a mole ratio of carbon dioxide to carbon tetrachloride of 5:3 and a flow rate of 65 grams of carbon tetrachloride per hour over thorium oxalate while:
   (a) heating said thorium oxalate to 200° C.,
   (b) maintaining said temperature for a period of 2 hours to remove any impurities present,
   (c) heating said thorium oxalate to 425° C.,
   (d) maintaining said temperature for a period of 6 hours until substantially all chlorination which will take place at this temperature is completed and a partially chlorinated thorium compound is formed,
   (e) heating said compound to 510° C.,
   (f) maintaining said temperature for 1½ hours until substantially all the chlorination which will take place at this temperature is completed,
   (g) heating said compound to 610° C.,
   (h) maintaining said temperature for 2 hours until said partially chlorinated compound is converted to high-purity thorium tetrachloride,
   reducing said thorium tetrachloride with magnesium to form high-purity thorium metal.

References Cited

UNITED STATES PATENTS

| | | | |
|---|---|---|---|
| 2,928,721 | 3/1960 | Mason et al. | 23—345 |
| 2,879,130 | 3/1959 | MacWood et al. | 23—326 |
| 1,646,734 | 10/1927 | Marden | 23—345 |

OTHER REFERENCES

Cothbert, Thorium Production Technology, Addison-Wesley Publishing Co., 1958, pp. 161–165, 180–184.

Bergman, Investigations of Some Methods of Preparing Thorium Chloride, N.S.A., vol. 21, #17, abstract 30,395, September 1967.

CARL D. QUARFORTH, Primary Examiner

MICHAEL J. McGREAL, Assistant Examiner

U.S. Cl. X.R.

23—21, 87, 91, 97